(12) United States Patent
Gopal et al.

(10) Patent No.: US 11,347,858 B2
(45) Date of Patent: May 31, 2022

(54) SYSTEM AND METHOD TO INHIBIT FIRMWARE DOWNGRADE

(71) Applicant: DELL PRODUCTS, LP, Round Rock, TX (US)

(72) Inventors: Janardan Rajagopal Pradeep Gopal, Round Rock, TX (US); Sudhir Mathane, Leander, TX (US)

(73) Assignee: Dell Products L.P., Round Rock, TX (US)

(*) Notice: Subject to any disclaimer, the term of this patent is extended or adjusted under 35 U.S.C. 154(b) by 446 days.

(21) Appl. No.: 16/517,995

(22) Filed: Jul. 22, 2019

(65) Prior Publication Data

US 2021/0026964 A1 Jan. 28, 2021

(51) Int. Cl.
*G06F 21/57* (2013.01)
*H04L 9/32* (2006.01)
*H04L 9/08* (2006.01)

(52) U.S. Cl.
CPC .......... *G06F 21/572* (2013.01); *G06F 21/575* (2013.01); *H04L 9/0897* (2013.01); *H04L 9/3247* (2013.01); *G06F 2221/033* (2013.01)

(58) Field of Classification Search
CPC .......... G06F 21/572; G06F 21/575; G06F 2221/033; H04L 9/0897; H04L 9/3247
See application file for complete search history.

(56) References Cited

U.S. PATENT DOCUMENTS

| | | | |
|---|---|---|---|
| 9,135,029 B2 | 9/2015 | Dasari et al. | |
| 9,223,982 B2 * | 12/2015 | Adams | G06F 21/57 |
| 9,558,354 B2 * | 1/2017 | Martinez | G06F 21/575 |
| 2005/0021968 A1 * | 1/2005 | Zimmer | G06F 21/572 |
| | | | 713/176 |
| 2005/0132351 A1 * | 6/2005 | Randall | G06F 11/1433 |
| | | | 717/168 |
| 2009/0254753 A1 * | 10/2009 | De Atley | G06F 21/51 |
| | | | 713/176 |
| 2012/0030731 A1 * | 2/2012 | Bhargava | G06F 21/566 |
| | | | 726/3 |
| 2014/0250291 A1 * | 9/2014 | Adams | G06F 21/575 |
| | | | 713/2 |
| 2016/0232343 A1 * | 8/2016 | Post | G06F 9/4401 |
| 2016/0323110 A1 * | 11/2016 | Campagna | H04L 9/0897 |
| 2017/0154184 A1 * | 6/2017 | Shivanna | G06F 21/44 |
| 2018/0167219 A1 * | 6/2018 | Campagna | H04L 9/0822 |
| 2018/0365424 A1 * | 12/2018 | Callaghan | G06F 21/575 |
| 2019/0073478 A1 * | 3/2019 | Khessib | G06F 21/572 |
| 2019/0205121 A1 * | 7/2019 | Ericson | H04L 9/0643 |
| 2020/0019397 A1 * | 1/2020 | Duran | H04L 9/3247 |
| 2020/0177397 A1 * | 6/2020 | Harrington | H04L 9/321 |

(Continued)

OTHER PUBLICATIONS

"Trusted Platform Module Library, Family '2.0' Level 00; Revision 01.38," TCG Published, Sep. 29, 2016, pp. 1-260.

*Primary Examiner* — Aurel Prifti

(74) *Attorney, Agent, or Firm* — Larson Newman, LLP

(57) ABSTRACT

A system initiates a boot operation that executes firmware, and retrieves an anti-roll back version table stored by a trusted platform module. The system determines that the firmware is invalid based on the anti-roll back version table retrieved from the trusted platform module, and aborts the boot operation in response to the determining that the firmware is invalid based on the anti-roll back version table.

14 Claims, 12 Drawing Sheets

(56) References Cited

U.S. PATENT DOCUMENTS

2020/0372157 A1* 11/2020 Singer .................. G06F 21/572
2021/0109746 A1*  4/2021 Brugman .............. H04L 9/0891
2021/0149663 A1*  5/2021 Zhang .................. G06F 21/572

* cited by examiner

SYSTEM AND METHOD TO INHIBIT FIRMWARE DOWNGRADE

FIELD OF THE DISCLOSURE

The present disclosure generally relates to information handling systems, and more particularly relates to prevention of downgrades in the firmware of information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An embedded controller protects an information handling system from firmware downgrade attacks or attempts. The embedded controller interfaces with a trusted platform module. The embedded controller functions as a root of trust with an ability to initiate the trusted platform module and to enforce cryptographic trust chaining on all boot components. The embedded controller initializes a manufacturer's version of the trusted platform module and measures platform integrity using manufacturer-specific PKI keys for runtime firmware. The root of trust may build, load, access or query an anti-roll back (or ARB) version table that logs firmware versions. The root of trust may thus log, record, or store the date/time of each firmware load or version (such as volume/IBB/Boot Block) in the ARB version table. The root of trust thus receives or consumes any firmware boot flow changes to accommodate consumption of extra boot components.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
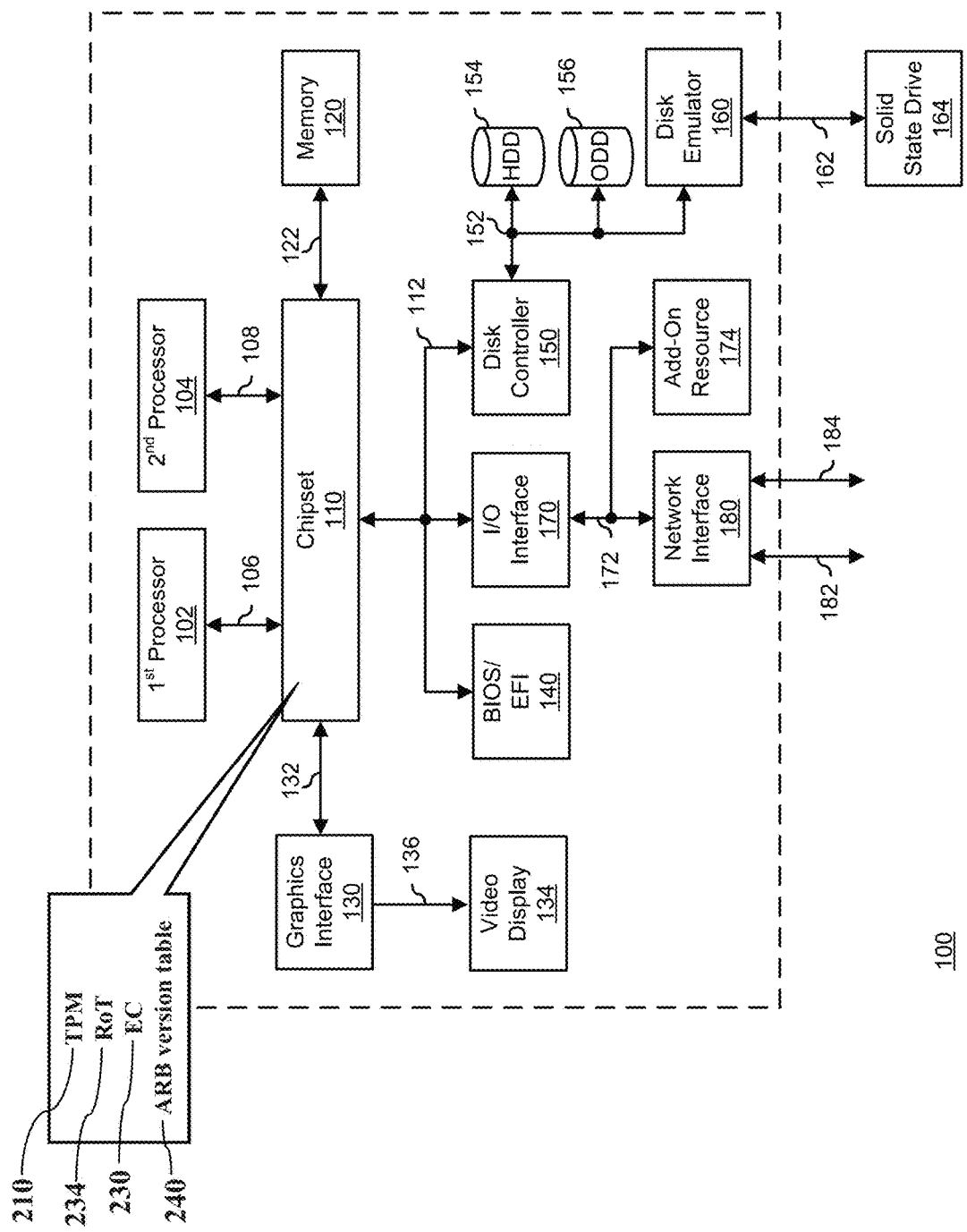
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

The information handling system 100 may include a trusted platform module (or TPM) 210 that implements a root of trust (or RoT) 234. The trusted platform module 210 interfaces with an embedded controller (EC) 230 (perhaps the chipset 110 and/or processors 102/104) to enforce cryptographic trust chaining on all boot components. The root of trust 234 is responsible to initialize a manufacturer's and/or platform supplier's version of the trusted platform module 210 (such as a discrete or dTPM), read and measure integrity with manufacturer/supplier-specific PKI keys for runtime firmware stored/located on the memory device 120 (such as a flash volume) and/or within the trusted platform module 210. The root of trust 234 may build, load, access or query an anti-roll back (or ARB) version table 240 that is also stored or maintained by the memory device 120 and/or within the trusted platform module 210. The root of trust 234 may manage platform assets and may also manage a secure boot operation.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a peripheral card disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
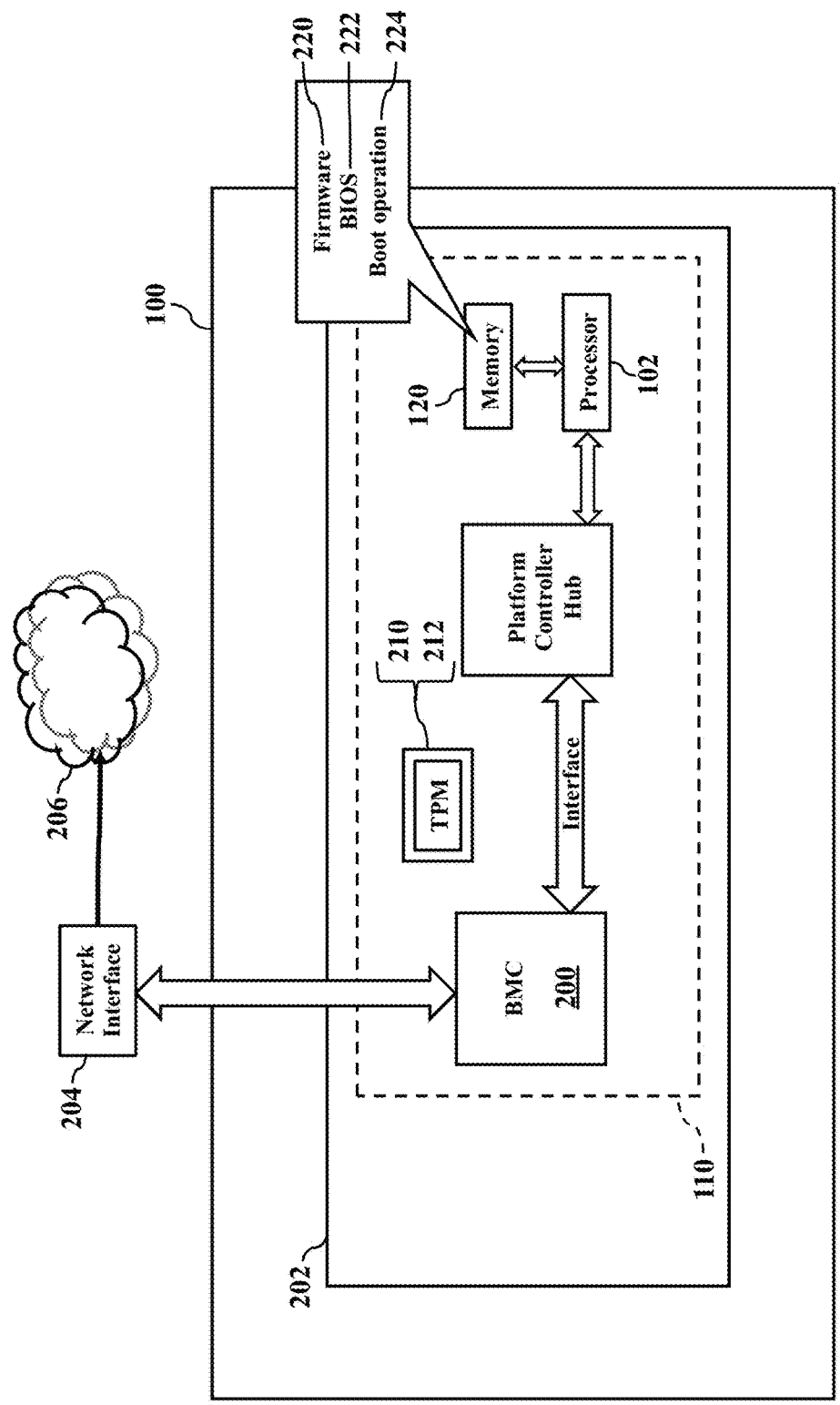
FIGS. 2-3 illustrate a trusted platform module (or TPM), according to exemplary embodiments.
Figure 3:
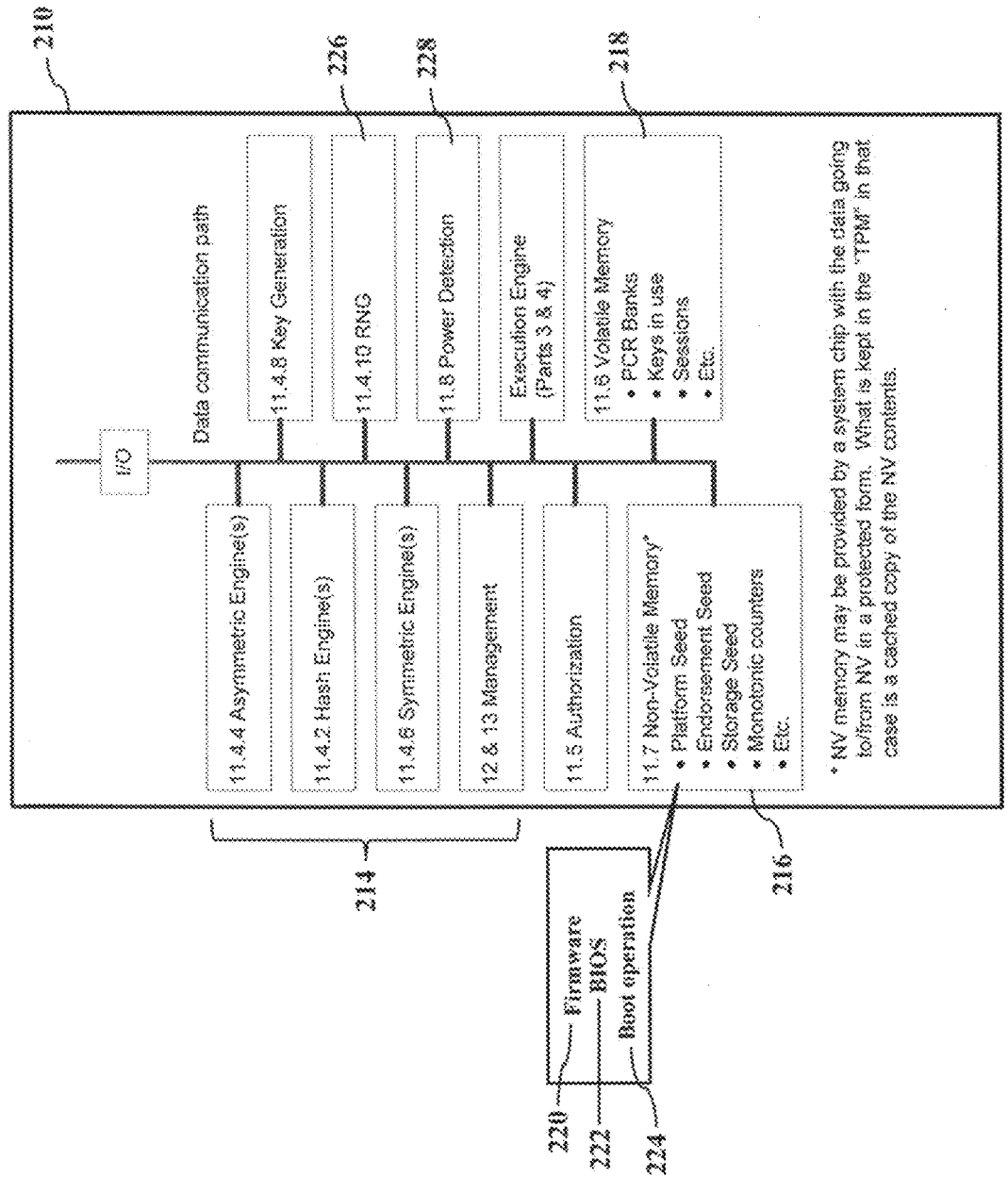

FIGS. 2-3 further illustrate the information handling system 100, according to exemplary embodiments. The information handling system 100 may also include a baseboard management controller 200 that has its own management processor and memory device that interface with a motherboard 202 (or planar) to provide side-band and out-of-band remote management (such as according to the Intelligent Platform Management Interface specification). The baseboard management controller 200 has one or more physical communications links and interfaces to the motherboard 202, thus allowing the baseboard management controller 200 to process messages according to the IPMI specification. The baseboard management controller 200 may thus monitor and remotely report the functions and performance of the information handling system 100 via a separate network interface 204 to a communications network 206. The baseboard management controller 200 and the IPMI specification are generally well known and thus need not be explained in detail.

FIGS. 2-3 also illustrate the trusted platform module (or TPM) 210. The trusted platform module 210 inserts into a socket 212 in the motherboard 202. The trusted platform module 210 is an integrated circuit, silicon chip, or microcontroller that is designed to secure hardware through integrated cryptographic keys. The trusted platform module 210 is tamper resistant by design and resists physical/electronic attacks. The trusted platform module 210 offers at least three (3) different domains of execution or isolation (platform or PRK, storage or SRK, and endorsement or EK) that may be controlled by different entities. The trusted platform module 210 has a dedicated hardware processor, memory device, a cryptographic engine, and an ability to bind each TPM chip to a specific device.

As FIG. 3 best illustrates, the trusted platform module 210 has several architectural components and/or functions for generating cryptographic keys that are used to bind and authenticate input and output data. For example, the trusted platform module 210 may have one or more engines 214 (such as a hardware processor(s) that interface with a persistent, non-volatile memory device 216 and/or a volatile memory device 218) that store representations of the firmware 220 and/or the basic input/output system (BIOS) 222 executed during a boot operation 224. The engines 214 may hash data using an electronic representation of a hashing function. A random number generator 226 generates one or more random numbers. Power detection circuitry 228 detects the presence or application of electric power (such as AC or DC generated by, or received from, a power supply). Further details of the TPM may be found in Trusted Platform Module Library, Part 1: Architecture (Trusted Computing Group 2016), which is incorporated herein by reference in its entirety.

The trusted platform module 210 protects against rogue or nefarious hacking. As the reader may understand, hackers can potentially downgrade to older, vulnerable versions of the firmware 220 on computers and servers to exploit data or assets of interest. Even though silicon vendors typically provide a mechanism to enforce downgrade prevention, these conventional solutions do not protect against brute physical downgrade attacks. That is, conventional solutions are schemes are built in secured boot flow by comparing a version of bootable or updatable software component against reference versions stored on NVM memory like flash device. These conventional solutions are thus only applicable for firmware updates via various legitimate firmware upgrade mechanism/tools. The conventional solutions thus do not provide protection from brute physical presence attacks (such as when an advisory could replace the SPI image and make a system boot with an older manufacturer-signed firmware image). One emerging solution to protect against physical downgrade attempts is to use hardware fuses to record different versions of the firmware 220 on the client system, but this recent proposal is typically limited to only a small number fuse bits that are available for version recording. Moreover, this recent proposal may only be accessible to privileged chipset firmware providers, and thus would only protect chipset manufacturer delivered firmware (and not DELL® signed or installed software components).

Figure 4:
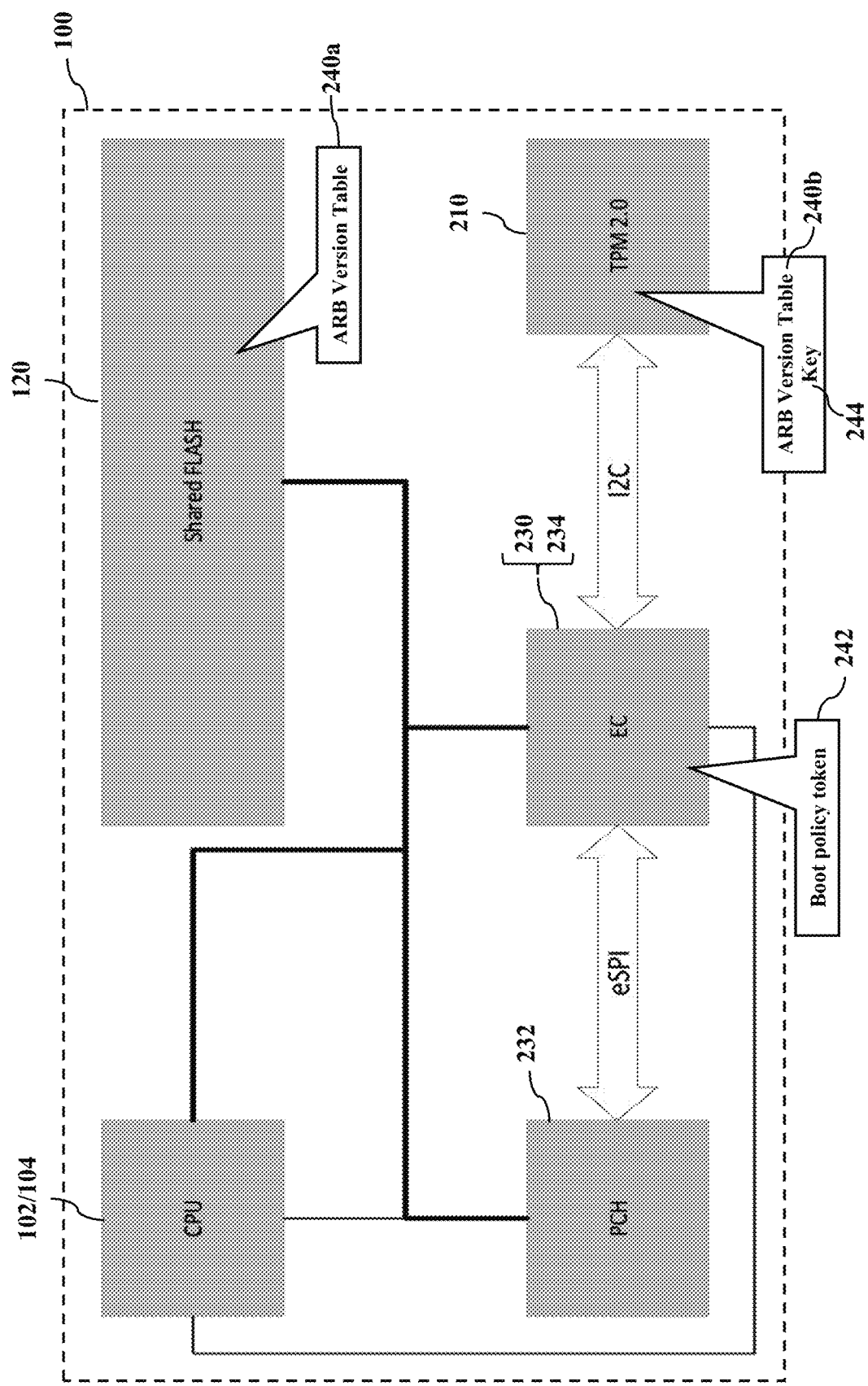
FIGS. 4-5 are schematic diagrams showing a system and method for protection against downgrade attacks, according to exemplary embodiments.
Figure 5:
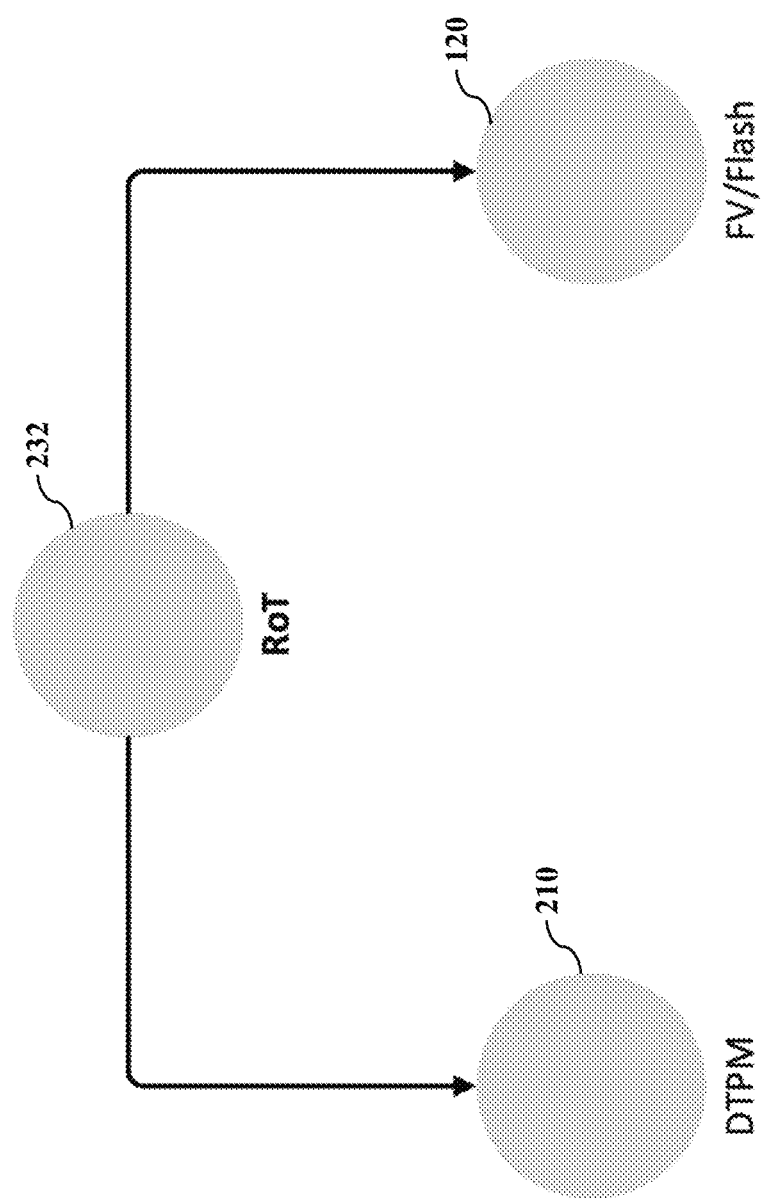

FIGS. 4-5 illustrate protection against downgrade attacks, according to exemplary embodiments. The root of trust 234 (perhaps the embedded controller 230) executes the trusted platform module 210 and/or the ARB version table 240 to protect the information handling system 100 against physical firmware downgrade attempts. The root of trust 234 interfaces with the trusted platform module (TPM 2.0) 210 and with the memory device 120. The root of trust 234, for example, interfaces with the trusted platform module 210 via any bus technology (such as the I²C or I2C serial bus protocol). The root of trust 234 also interfaces with the CPU processors 102/104, the platform controller hub (PCH) 232, and the memory device 120 (such as a flash volume). While the root of trust 234 may utilize any hardware processor, the root of trust 234 may be the baseboard management controller 200 (illustrated in FIG. 2). The embedded controller 230 functions as the root of trust (or RoT) 234 with an ability to initiate the trusted platform module 210 and to enforce cryptographic trust chaining on all boot components. The root of trust 234 initializes a manufacturer's and/or platform supplier's version of the trusted platform module 210 (such as a discrete or dTPM), read and measure integrity with manufacturer/supplier-specific PKI keys for runtime firmware stored/located on the memory device 120 (such as a flash volume) and/or within the trusted platform module 210. The root of trust 234 loads, accesses or queries the anti-roll back (or ARB) version table 240 that is also stored or maintained within the trusted platform module 210. The root of trust 234 may receive or consume a boot policy token 242 which describes a platform policy for the ARB version table 240. The root of trust 234 may log, record, or store the date/time of each firmware load or version (such as volume/IBB/Boot Block) in the ARB version table(s) 240a-b. The root of trust 234 thus receives or consumes any firmware boot flow changes to accommodate consumption of extra boot components (such as the OEM/supplier-signed ARB version table 240 and the boot policy token 242).

The trusted platform module 210 protects the ARB version table 240. While the ARB version table 240 may be stored in any of the memory devices 120, the ARB version table 240 may be stored or maintained in any memory controlled by the platform supplier/OEM (such as the dedicated non-volatile memory device 216 (illustrated in FIG. 3) of the trusted platform module 210). The ARB version table 240, for example, may be stored in platform supplied protected NV memory of the trusted platform module 210 and flash memory where other bootable components are stored. The trusted platform module 210 provides an additional or optional ability to bind the ARB version table 240 to a specific platform by hashing with a unique device encryption key 244. The device encryption key 244, for example, may be specifically assigned to the information handling system 100, to the motherboard 202, to the platform controller hub (PCH) 232, to the baseboard management controller 200, to the embedded controller 230, to the network interface 204, to the trusted platform module 210, and/or to the root of trust 234. The trusted platform module 210 enables replay attack protection by generating and storing a hash value representing the ARB version table 240 in Replay Protected portion of the non-volatile memory device 216. The boot policy token 242 determines whether or not to enable an TPM-based anti-roll back check to accommodate platforms without the trusted platform module 210. The manufacturer-signed ARB version table 240 has database entries that store, map, associate, and reference version information for each system component of the firmware 220 that is executed by the information handling system 100. Indeed, while the trusted platform module 210 may protect the entire ARB version table 240, its size in bytes may grow too large, so the trusted platform module 210 may choose to protect only its corresponding hash value.

The embedded controller 230 (executing the root of trust 234) is hardware interfaced to the trusted platform module 210. The trusted platform module 210 may utilize a public/private cryptographic key for accessing the memory device 120 (read only, random access, non-volatile).

Exemplary embodiments thus present an elegant solution. Exemplary embodiments utilize the root of trust 234 and the trusted platform module 210 to prevent firmware downgrades. Exemplary embodiments utilize the TPM 2.0's Platform Supplier abilities to protect ARB version table 240 under total supplier/manufacturer/OEM ownership. Exemplary embodiments may also utilize TPM 2.0's in built replay protection mechanism to harden protection against the ARB version table 240. Exemplary embodiments may also utilize TPM 2.0's ability to hash/bind the ARB version table 240 to a specific platform/supplier and make it unusable by/on other platforms. Exemplary embodiments may also extend the root of trust 234 strategy utilizing TPM PRK to protect system firmware from remote and physical downgrade attacks. Exemplary embodiments thus overcome the current limitation of downgrade protection switch in the system BIOS which only protects downgrade of BIOS through legitimate BIOS update mechanism such as OEM/Dell BIOS flash tool, Windows update, DCPM etc.

FIGS. 4-5 also illustrate architectural interfaces. The root of trust 234 may interface with the trusted platform module 210 and with the platform controller hub 230. The platform controller hub 230 also interfaces with the hardware processor 102/104 and with the memory device 120 (such as non-volatile solid-state memory). The platform controller hub 230 is a chip-set that controls data paths and support functions for the hardware processor 102/104 (such as system clocking, flexible display interface or FDI, and direct media interface or DMI). Because the platform controller hub 230 is well known, this disclosure need not repeat the known details. The conventional trusted platform module 210 usually interfaces with, and is driven by, the platform controller hub 230. As FIG. 4 illustrates, though, the trusted platform module 210 directly interfaces with the root of trust 234 (such as the embedded controller 230) via any bus technology. Again, while the root of trust 234 may utilize any external hardware processor to the trusted platform module 210, the root of trust 234 may be the baseboard management controller 200. The trusted platform module 210, for example, may interface with the baseboard management controller 200 using any bus technology (such as the I²C or I2C serial bus protocol). The baseboard management controller 200 may interface with the platform controller hub 230 using any bus technology (such as the System Packet Interface or SPI).

Figure 6:
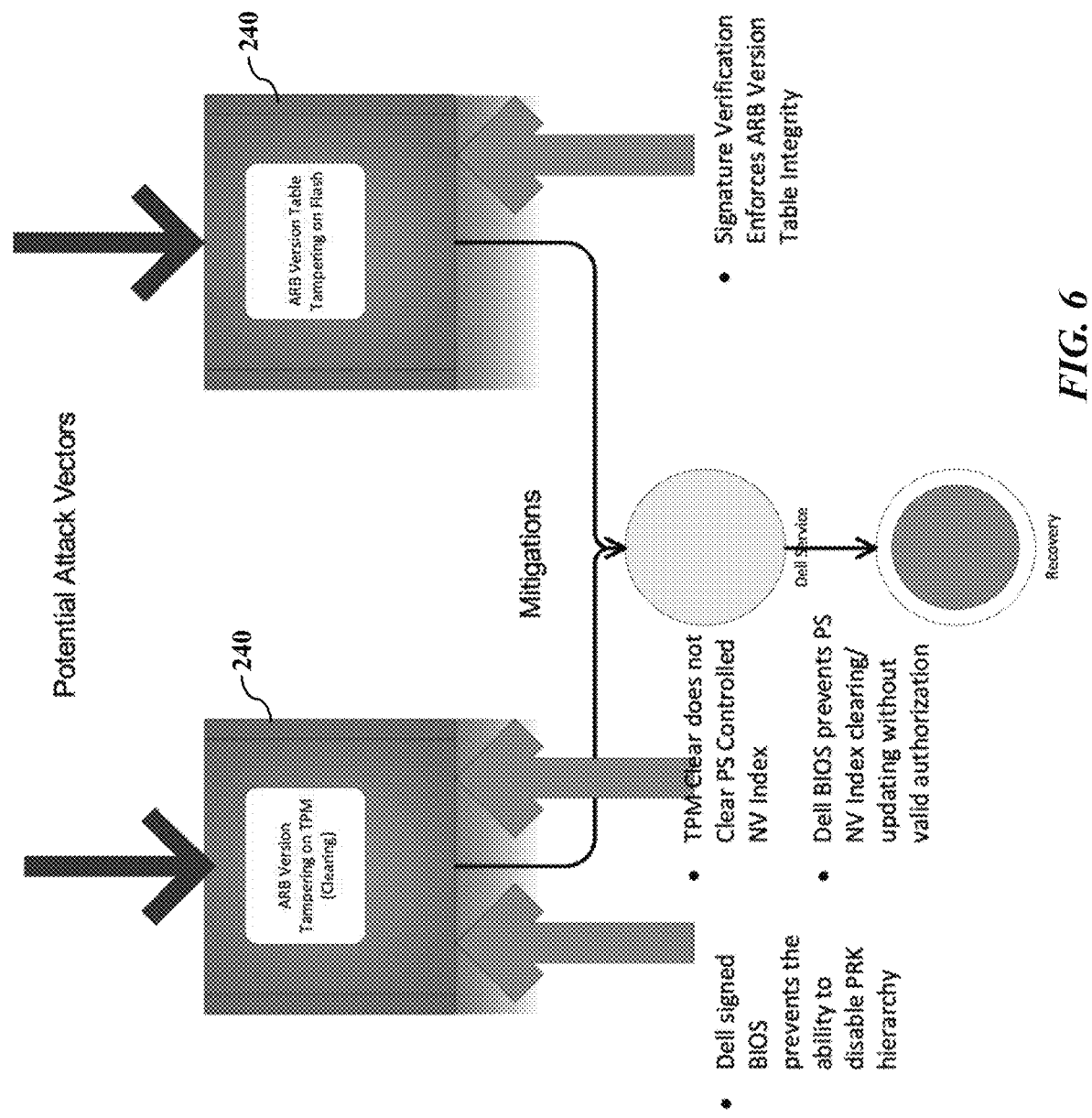
FIG. 6 is a schematic diagram showing a system and method for security resilience, according to exemplary embodiments.

FIG. 6 illustrates security resilience, according to exemplary embodiments. The trusted platform module 210, protecting the integrity of the ARB version table 240, thwarts common attack vectors. For example, one such attack vector has the attacking TPM 210 attempt to tamper with the ARB version table 240 and/or attempt to tamper with the stored hash value representing the ARB version table 240. Attack vectors can come from "TPM clear" operation and direct alteration of system flash. Another attack vector has the attacking SPI to tamper with the ARB version table 240 itself. Regardless, with any of these attack vectors, the integrity of the information handling system 100 is compromised, and the mitigation is to prevent the information handling system 100 from booting. The only ways to recover are by replacing the motherboard 202 (illustrated in FIG. 2) and/or resetting/reflashing the firmware and ARB mechanism.

Figure 7:
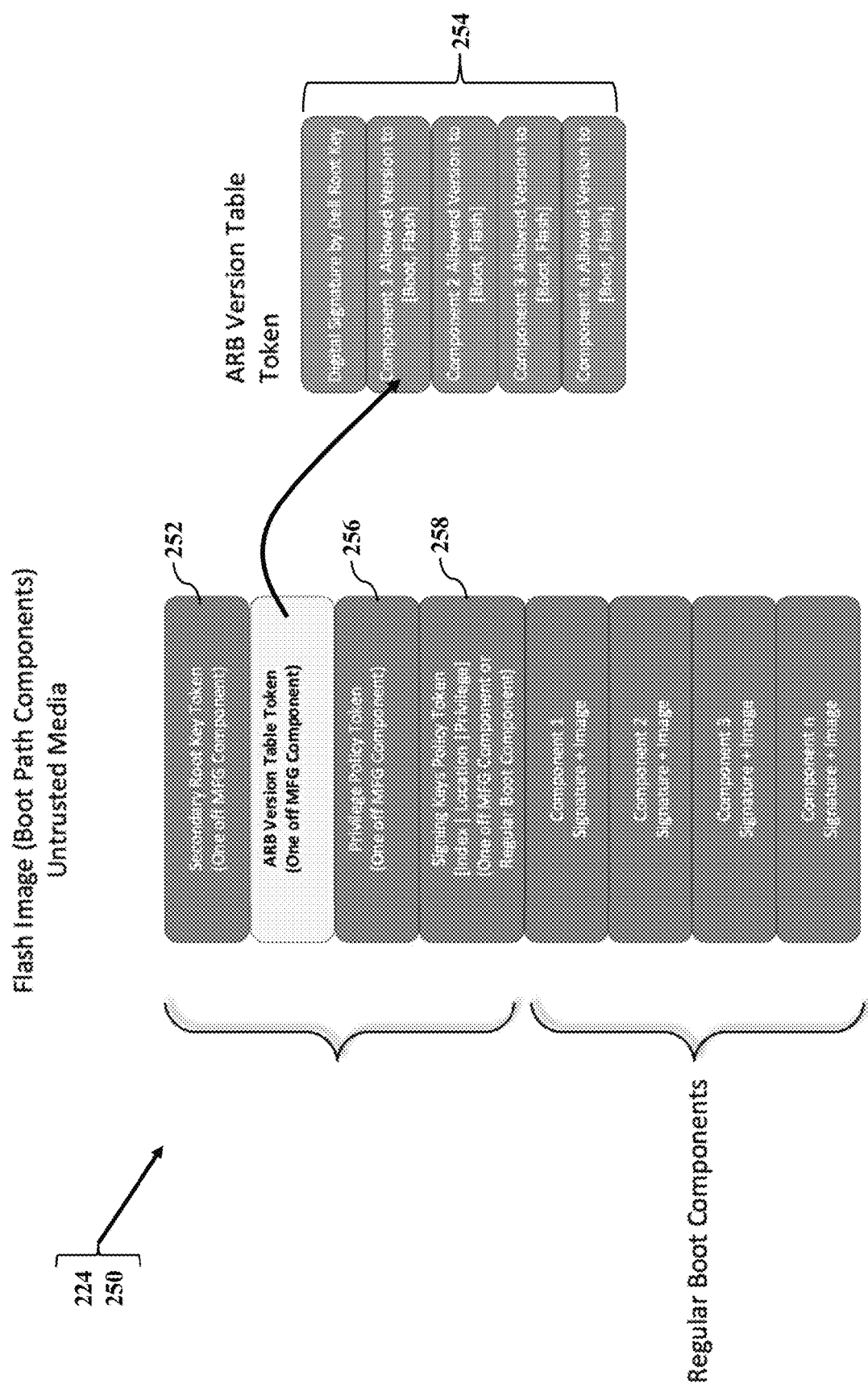
FIG. 7 is a schematic diagram showing a flash image during a boot operation, according to exemplary embodiments.

FIG. 7 illustrates a flash image during the boot operation 224, according to exemplary embodiments. The flash image is a view of the blocks of the firmware 220 which also has the block describing, or referencing, the ARB version table 240. When electrical power is applied or detected, the information handling system 100 reads the basic input/output system (BIOS) 222 and other firmware 220 stored in the read-only memory device 120. A power-on self-test (or POST) 250 is executed during the boot operation 224, perhaps along with other software applications (such as the firmware 220 and an operating system). A first token (such as a secondary root key token 252 by a manufacturer) may be received, set, or established as an additional component during the boot operation 224. A second token (such as an ARB version table token 254 generated by the manufacturer) may be received, set, or established as an additional component during the boot operation 224. For example, the ARB version table token 254 may specify a manufacturer's digital signature (such as via a root key). The ARB version table token 254 may also specify which version of the regular boot components are permitted/allowed to execute during the boot operation 224. A third token (such as a privilege policy token 256 generated by the manufacturer) may be received, set, or established as an additional component during the boot operation 224. Moreover, a fourth token (such as a signing keys policy token 258) may be received, set, or established as an additional or regular component during the boot operation 224.

Figure 8:
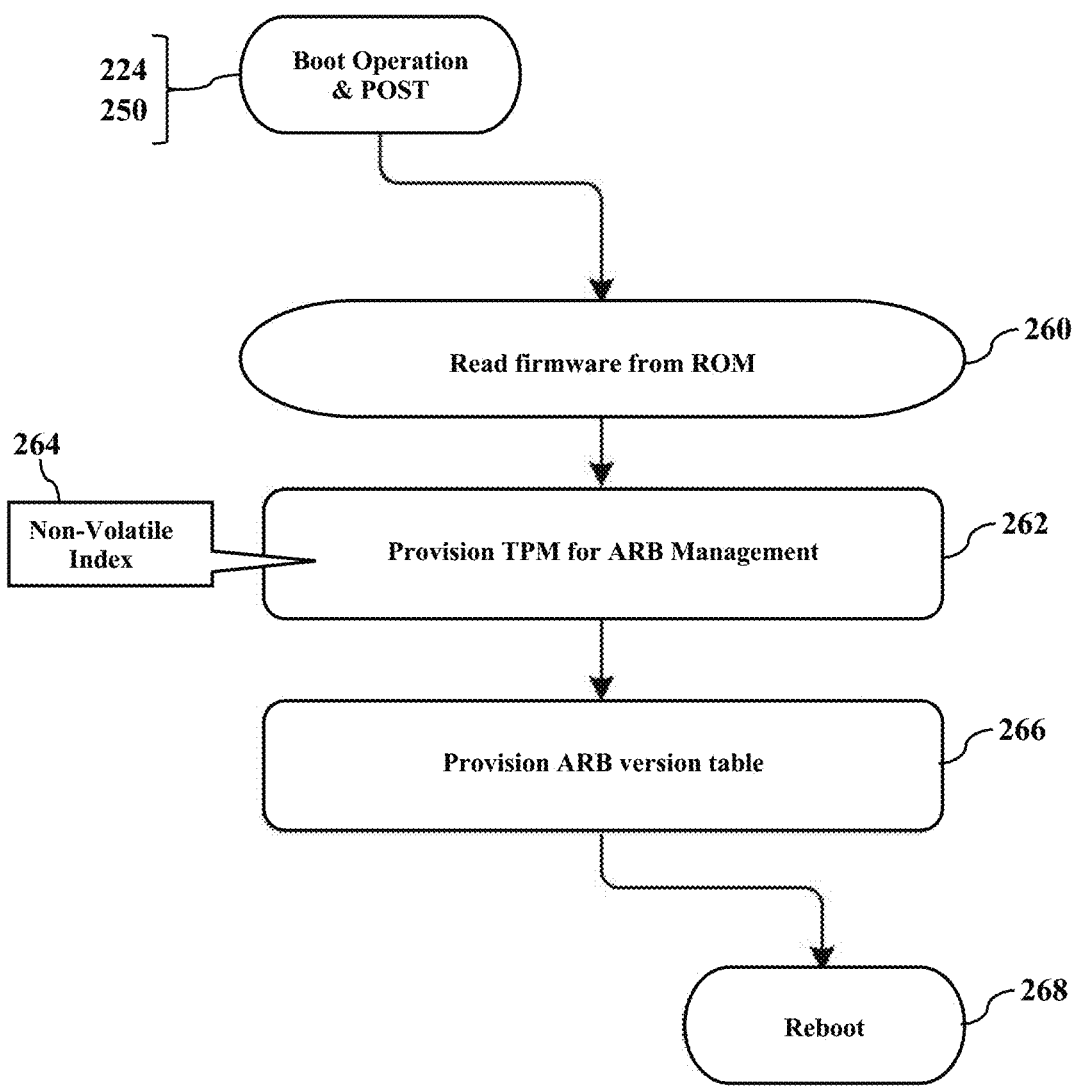
FIGS. 8-10 are provisioning flowcharts for preventing firmware downgrades, according to exemplary embodiments.

FIGS. 8-12 illustrate flowcharts for inhibiting firmware downgrades, according to exemplary embodiments. Any manufacturing environment is assumed to be trusted and secure. The manufacturing environment should be able to use a regular serial peripheral interface (SPI) image. As FIG. 8 illustrates, the manufacturing flow is, at its simplest, a two-step provisioning process that first provisions the trusted platform module 210. That is, during the boot operation 224, the power-on self-test (or POST) 250 is executed and the firmware 220 is read from the read-only memory (260). The firmware first causes the root of trust 234 to provision the trusted platform module 210 for ARB management (262). The trusted platform module 210 is configured or provisioned with a non-volatile index 264 having correct attributes and correct authorization, and the non-volatile index 264 is created with a Platform_Supplied key (such as the key 244 explained with reference to FIG. 4) or data (for example from the root of trust 234 and/or the embedded controller 230) to ensure BIOS/firmware ownership. Second, the firmware 220 causes the root of trust 234 to provision the ARB version table 240 in the dedicated non-volatile memory device 216 (266). The ARB version table 240 may thus be configured or provisioned at the non-volatile index 264 (created in Block 262). Any reboot operation may then performed (268).

Figure 9:
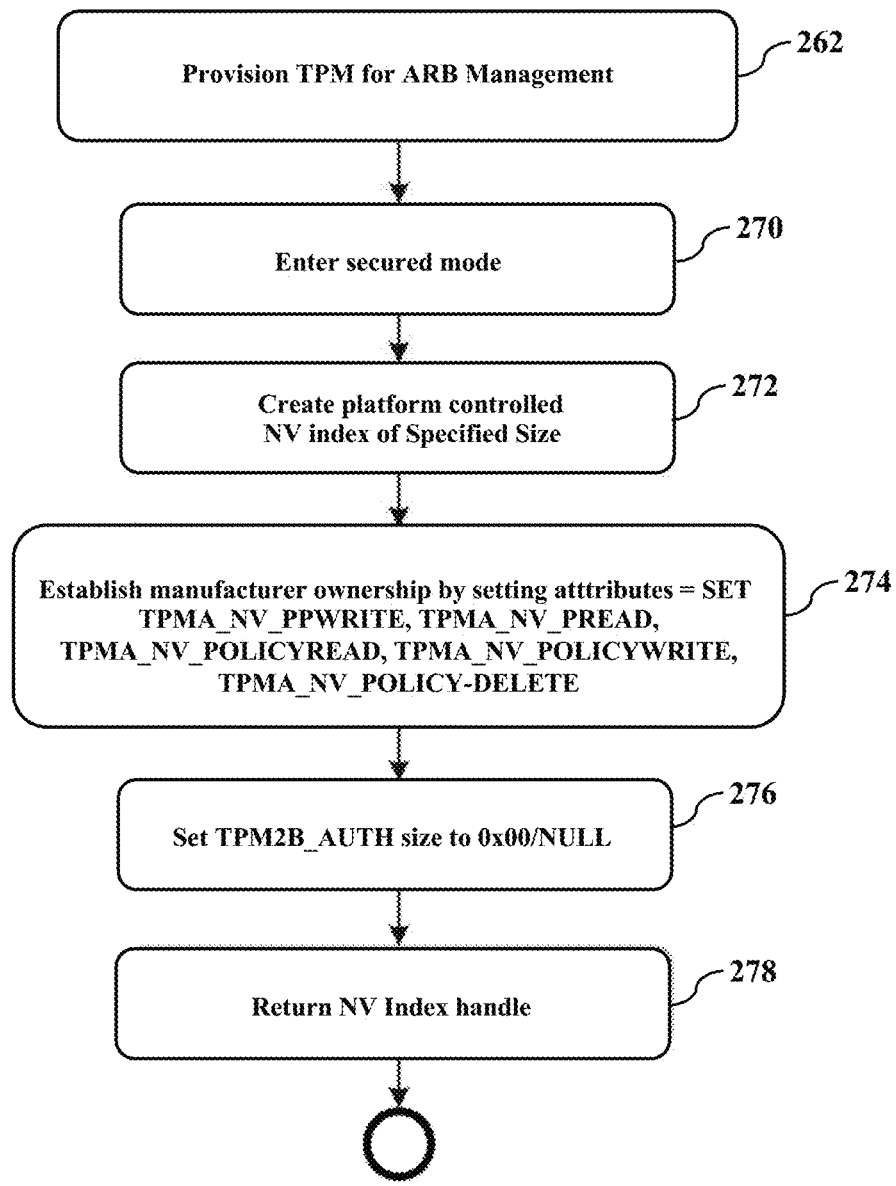

FIG. 9 illustrates a provisioning flow. When the trusted platform module 210 is provisioned the for ARB management (262), the root of trust 234 and/or the trusted platform module 210 enters a secure mode (270). The non-volatile index 264 is created (274) with the Platform_Supplied key or data to hashingly bind the non-volatile index 264 to a unique identifier or key associated with the IHS 100 (such as the key 244 explained with reference to FIG. 4). The OEM then establishes ownership by setting various attributes of the non-volatile index 264 (274). The size of the non-volatile index 264 is authorized (276) and the handle or name of the non-volatile index 264 is returned (278) (perhaps to the embedded controller 230).

Figure 10:
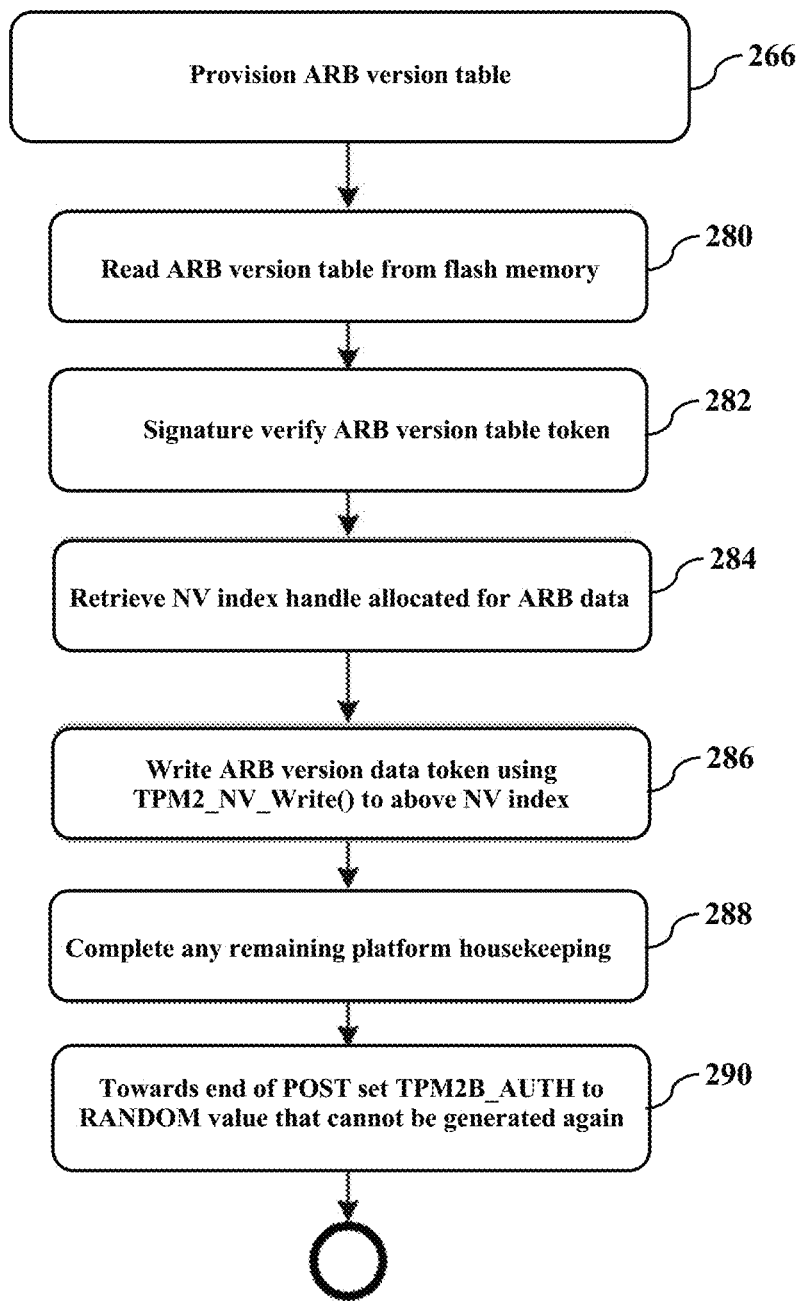

As FIG. 10 further illustrates, next the ARB version table 240 is provisioned (266). The ARB version table 240 is read from the flash memory 120 (280) and the cryptographic signature of the ARB version table token 254 is verified (282) (such as hash values of current and stored version are compared/checked for match). The handle or name of the NV index 264 (allocated for ARB data) is read/retrieved (284). The ARB version table token 254 and/or ARB version data is/are written to the memory devices 120, 216, and/or 218 using TPM2_NV_Write( ) to above NV index 264 (286). Platform housekeeping is completed (288) and, prior to an end of the POST 250, provisioning sets TPM2B_AUTH to a RANDOM value that cannot be again generated (290).

FIGS. 8-10 thus illustrate the simplest, two-step process. First, the trusted platform module 210 is provisioned for ARB management (as FIGS. 8 & 9 illustrated). Second, the ARB version table 240 is provisioned (as FIGS. 8 and 10 illustrated). This anti-rollback scheme is restricted to the manufacturer's BIOS only owing to the NV Index 264 being under the manufacturer's BIOS control with correct attributes and authorization policies. Locking down window of firmware "upgrade" only during the boot operation 224 and randomizing authorization policy/data to make it impossible to generate it again after POST 250. Randomization being boot cycle specific and changes upon every boot operation 224 and/or POST 250.

Figure 11:
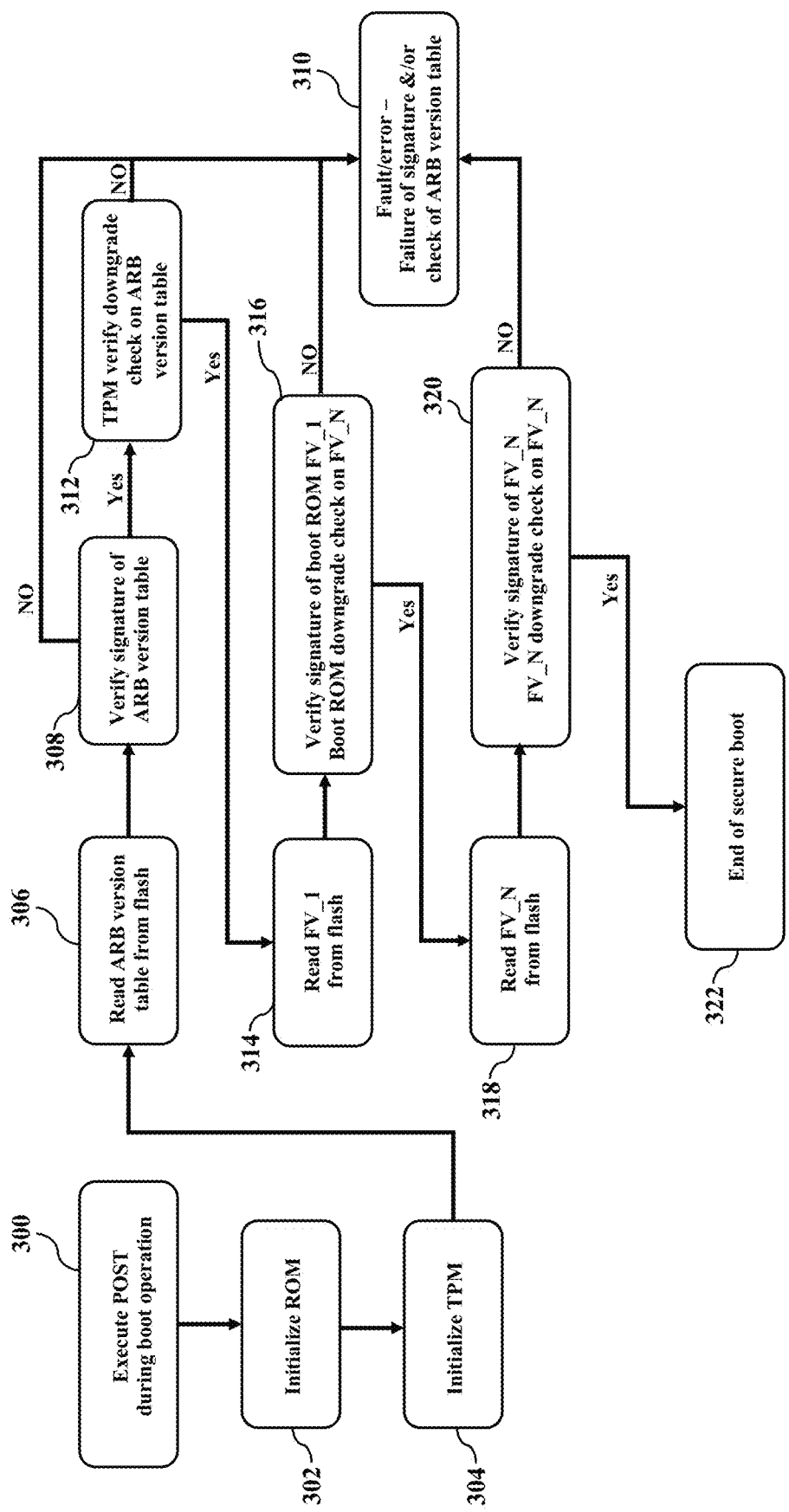
FIG. 11 is a flowchart showing a method for downgrade prevention during boot, according to exemplary embodiments.

FIG. 11 illustrates the regular boot operation 224. The power-on self-test (POST) 250 is executed during the boot operation 224 (300). The read-only memory is initialized (302) and the trusted platform module 210 is initialized (304). The ARB version table 240 is read from the memory device 120 and/or from the trusted platform module 210 (306). The cryptographic signature (such as hash value) representing the ARB version table 240 is verified (308). If the cryptographic signature fails to match a stored or master or previously-generated value, then a fault or error is flagged or generated (310). However, if the cryptographic signature matches or favorably compares to the stored or master or previously-generated value, then the trusted platform manager 210 verifies a downgrade check based on the ARB version table 240 (312). For example, the trusted platform manager may query the ARB version table 240 for an indication that the version of the firmware matches an entry logged or recorded to the ARB version table 240. If an entry in the ARB version table 240 indicates that the firmware is an old/stale/historic (perhaps by older hash value, timestamp or version), then a downgrade or rollback attempt is inferred and another fault or error is flagged or generated (310). However, if the firmware is current according to the ARB version table 240, then the trusted platform module 210 reads a firmware value (such as FV_1) from the flash memory 120 (314) and verifies its cryptographic signature (such as hash value) and performs a downgrade check based on the ARB version table 240 (316). If the cryptographic signature of FV_1 fails to match a stored or master or previously-generated value, and/or the FV_1 value fails to match an entry in the ARB version table 240, then a fault or error is flagged or generated (310). However, if the cryptographic signature of FV_1 verifies its historical value, and/or the FV_1 value satisfies an entry in the ARB version table 240, then the trusted platform module 210 reads another firmware value (such as FV_2), verifies its cryptographic signature, and performs the downgrade check based on the ARB version table 240. If the cryptographic signature of FV_2 fails to match a stored or master or previously-generated value, and/or the FV_2 value fails to match an entry in the ARB version table 240, then the fault or error is flagged or generated (310). However, if the cryptographic signature of FV_2 verifies its historical value, and/or the FV_2 value satisfies the ARB version table 240, then the trusted platform module 210 reads yet another firmware value (such as FV_3), verifies its cryptographic signature, and performs the downgrade check based on the ARB version table 240. The trusted platform module 210 may thus continue successively reading and checking the firmware values (perhaps up to a final FV_N value) (Blocks 318 and 320). If any FV_N value fails, the fault or error is flagged or generated (310) and the boot operation 224 is aborted. If all the FV_1-N values verify, the secure boot operation 224 executes to final completion or end (322).

The embedded controller 230 or root of trust 234 may thus verify the ARB version table 240. The embedded controller 230 or root of trust 234 may retrieve and verify a hash value representing the ARB version table 240. The embedded controller 230 or root of trust 234 may additionally or alternatively retrieve and verify the raw data representing the ARB version table 240. Regardless, the embedded controller 230 or root of trust 234 may verify the ARB version table 240 specified or referenced by the serial peripheral interface (SPI) image with the ARB version table 240 retrieved from the non-volatile memory 216 of the trusted platform module 210. If the ARB version table 240 specified or referenced by the serial peripheral interface (SPI) image satisfactorily matches the ARB version table 240 retrieved from the non-volatile memory 216 of the trusted platform module 210, then no downgrade attempt is inferred or detected and the boot operation 224 may proceed to retrieve/execute any next components. However, if the ARB version table 240 specified or referenced by the serial peripheral interface (SPI) image fails to satisfy the ARB version table 240 retrieved from the non-volatile memory 216 of the trusted platform module 210, then a downgrade attempt is inferred/detected and the boot operation 224 aborts. Each subsequent firmware component (such as FV_1 . . . FV_N) also verifies its own version with the TPM confirmed version information to allow un-tampered boot only.

Figure 12:
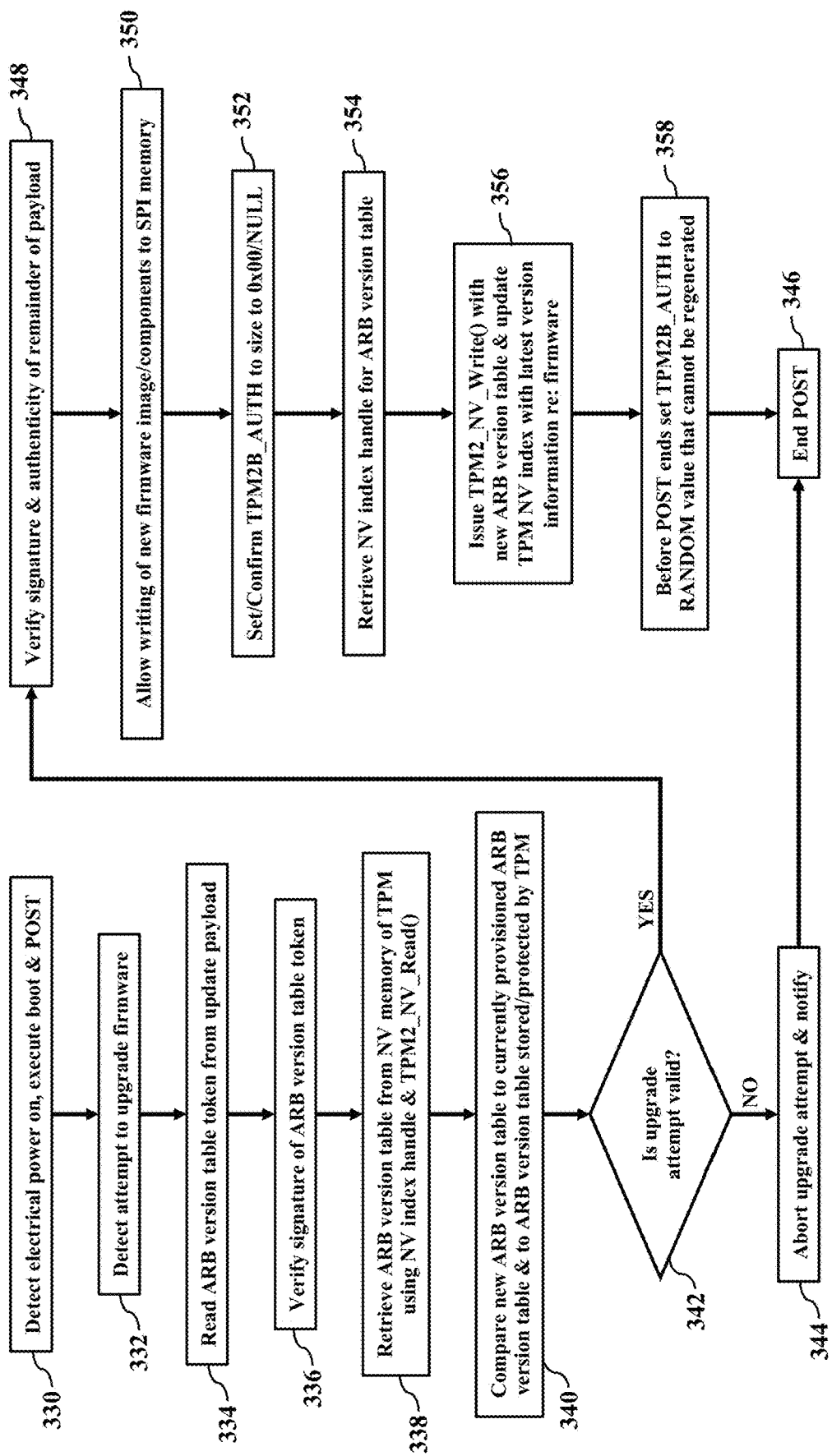
FIG. 12 is a flowchart showing a method for field updates to an ARB version table, according to exemplary embodiments.

FIG. 12 illustrates firmware upgrades. Electrical power is received, the boot operation begins, and the power on self-test is executed (330). An attempt to upgrade the firmware is detected (332) and the ARB version table token 254 is read from an update payload (334). The cryptographic signature representing the ARB version table token 254 is verified against a stored or historical value (336). The root of trust 234 queries the trusted platform module 210 and retrieves the ARB version table 240 stored in its non-volatile memory 216 (perhaps using the NV index handle and the TPM2_NV_Read( )) (338). The new ARB version table 240 (referenced by the ARB version table token 254 or otherwise specified by the attempt to upgrade the firmware 220) is compared to the currently provisioned ARB version table 240 and to the ARB version table 240 retrieved from the trusted platform module 210 (340). If the new ARB version table 240 unfavorably compares or fails to match the currently provisioned ARB version table 240 and/or the ARB version table 240 retrieved from the trusted platform module 210, then the attempt to upgrade the firmware 220 is inferred or determined to be invalid (342) and the upgrade attempt is aborted (344). The invalid upgrade attempt may also trigger a notification scheme (such as warning messages, LED indicator lights, SMS/email text messages to notification addresses). Because the firmware upgrade is invalid, the power on self-test 250 and the boot operation 224 may end. However, the power on self-test and the boot operation 224 may finish execution using the currently provisioned ARB version table 240 and current firmware 220 (346).

The upgrade may be valid. If the new ARB version table 240 favorably compares or even matches the currently provisioned ARB version table 240 and/or the ARB version table 240 retrieved from the trusted platform module 210, then the attempt to upgrade the firmware is inferred or determined to be valid (342). The cryptographic signature representing the new ARB version table 240 may be verified, perhaps including an authenticity of the update payload (348). The new ARB version table 240 is written to the memory 120 (such as SPI memory) (350). If not already set, establish or confirm that the TPM2B_AUTH is sized to 0x00/NULL (352). The NV index handle for the ARB version table 240 is retrieved (354). The TPM2_NV_Write( ) is issued with the new ARB version table 240 and the TPM NV index 264 is updated with the latest version information regarding the firmware (356). Towards the end of the POST, the TPM2B_AUTH value is set to a RANDOM value that cannot be regenerated (358). The power on self-test and the boot operation 224 may finish execution using the currently provisioned ARB version table 240 and current firmware (346).

Exemplary embodiments present an elegant solution. Every time a valid firmware upgrade attempt is detected (perhaps by BIOS/firmware), the incoming or new ARB version table 240 is compared with the ARB version table 240 stored by the trusted platform module 210. If the new ARB version table 240 satisfies the ARB version table 240 stored by the trusted platform module 210, then firmware upgrade attempt is valid and authentic. Only upon a successful verification and actual upgrade would the root of trust 234 write the new ARB version table 240 for storage by the trusted platform module 210. This downgrade protection scheme is thus restricted to only the manufacturer's BIOS, owing to the NV index 264 being under the manufacturer's BIOS control with right attributes and authorization policies. Locking down a permissible window of firmware upgrade (such as only during the boot operation 224 and/or the POST 250), and randomizing the authorization policy/data, renders it impossible to generate the same random number again after the POST 250 (the randomization being boot cycle specific).

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
   initiating, by a hardware processor, a boot operation that executes a first version of a firmware;
   retrieving an anti-roll back version table stored by a trusted platform module, wherein the anti-roll back version table specifies which particular version of the firmware is allowed to execute;
   subsequent to successfully verifying a cryptographic signature associated with the first version of the firmware, determining whether the first version of the firmware is valid or invalid;
   determining that the first version of the firmware is invalid based on the anti-roll back version table retrieved from the trusted platform module when the first version of the firmware does not match the particular version specified in the anti-roll back version table that is allowed to execute;
   aborting, by the hardware processor, the boot operation in response to the determining that the first version of the firmware is invalid based on the anti-roll back version table;
   determining that the first version of the firmware is valid based on the anti-roll back version table when the first version of the firmware matches the particular version specified in the anti-roll back version table;
   performing subsequent verification of other firmware versions in response to the determining that the first version of the firmware is valid based on the anti-roll back version table; and
   performing secure boot operation when the subsequent verification of the other firmware versions is valid.

2. The method of claim 1, further comprising storing the anti-roll back version table in a non-volatile memory of the trusted platform module.

3. The method of claim 1, wherein the retrieving of the anti-roll back version table further comprises retrieving the anti-roll back version table from a non-volatile memory of the trusted platform module.

4. The method of claim 1, further comprising generating a specific cryptographic signature representing the anti-roll back version table.

5. The method of claim 1, further comprising reading the firmware from a memory device.

6. A system, comprising:
a hardware processor; and
a memory device accessible to the hardware processor, the memory device storing instructions that when executed cause the hardware processor to perform operations including:
initiating a boot operation that executes a first version of a firmware;
retrieving an anti-roll back version table stored by a trusted platform module, wherein the anti-roll back version table specifies which particular version of the firmware is allowed to execute;
determining that the first version of the firmware is invalid based on the anti-roll back version table retrieved from the trusted platform module when the first version of the firmware does not match the particular version specified in the anti-roll back version table that is allowed to execute;
aborting the boot operation in response to the determining that the first version of the firmware is invalid based on the anti-roll back version table;
determining that the first version of the firmware is valid based on the anti-roll back version table when the first version of the firmware matches the particular version specified in the anti-roll back version table;
performing subsequent verification of other firmware versions in response to the determining that the first version of the firmware is valid based on the anti-roll back version table; and
performing secure boot operation when the subsequent verification of the other firmware versions is valid.

7. The system of claim 6, wherein the operations further comprise storing the anti-roll back version table in a non-volatile memory of the trusted platform module.

8. The system of claim 6, wherein the operations further comprise retrieving the anti-roll back version table from a non-volatile memory of the trusted platform module.

9. The system of claim 6, wherein the operations further comprise generating a cryptographic signature representing the anti-roll back version table.

10. The system of claim 6, wherein the operations further comprise reading the firmware from the memory device.

11. A non-transitory memory device storing instructions that when executed cause a network interface card to perform operations comprising:
initiating a boot operation that executes a first version of a firmware;
retrieving an anti-roll back version table stored by a trusted platform module, wherein the anti-roll back version table specifies which particular version of the firmware is allowed to execute;
subsequent to successfully verifying a cryptographic signature associated with the first version of the firmware, determining whether the first version of the firmware is valid or invalid;
determining that the first version of the firmware is invalid based on the anti-roll back version table retrieved from the trusted platform module when the first version of the firmware does not match the particular version specified in the anti-roll back version table that is allowed to execute;
aborting the boot operation in response to the determining that the first version of the firmware is invalid based on the anti-roll back version table;
determining that the first version of the firmware is valid based on the anti-roll back version table when the first version of the firmware matches the particular version specified in the anti-roll back version table;
performing subsequent verification of other firmware versions in response to the determining that the first version of the firmware is valid based on the anti-roll back version table; and
performing secure boot operation when the subsequent verification of the other firmware versions is valid.

12. The non-transitory memory device of claim 11, wherein the operations further comprise storing the anti-roll back version table in a non-volatile memory of the trusted platform module.

13. The non-transitory memory device of claim 11, wherein the operations further comprise retrieving the anti-roll back version table from a non-volatile memory of the trusted platform module.

14. The non-transitory memory device of claim 11, wherein the operations further comprise generating a specific cryptographic signature representing the anti-roll back version table.

* * * * *